United States Patent
Behabtu et al.

(10) Patent No.: US 11,208,765 B2
(45) Date of Patent: *Dec. 28, 2021

(54) WATER INSOLUBLE ALPHA-(1,3-GLUCAN) COMPOSITION

(71) Applicant: NUTRITION & BIOSCIENCES USA 4, INC., Rochester, NY (US)

(72) Inventors: Natnael Behabtu, Wilmington, DE (US); Xiaoqing Li, Newark, DE (US); Michael Stephen Wolfe, Wilmington, DE (US)

(73) Assignee: NUTRITION & BIOSCIENCES USA 4, INC., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/942,828

(22) Filed: Jul. 30, 2020

(65) Prior Publication Data

US 2020/0354895 A1   Nov. 12, 2020

Related U.S. Application Data

(63) Continuation of application No. 15/756,681, filed as application No. PCT/US2016/058453 on Oct. 24, 2016, now Pat. No. 10,731,297.

(60) Provisional application No. 62/246,308, filed on Oct. 26, 2015.

(51) Int. Cl.
| | |
|---|---|
| *D21H 19/00* | (2006.01) |
| *D21H 19/62* | (2006.01) |
| *C08B 37/00* | (2006.01) |
| *C09D 105/00* | (2006.01) |
| *D06P 1/48* | (2006.01) |
| *D06P 1/44* | (2006.01) |
| *D21H 21/16* | (2006.01) |
| *D21H 19/52* | (2006.01) |
| *C08L 5/00* | (2006.01) |
| *D06P 5/30* | (2006.01) |
| *D21H 19/36* | (2006.01) |
| *D21H 19/72* | (2006.01) |
| *C08K 13/08* | (2006.01) |

(52) U.S. Cl.
CPC ......... *D21H 19/62* (2013.01); *C08B 37/0009* (2013.01); *C08L 5/00* (2013.01); *C09D 105/00* (2013.01); *D06P 1/44* (2013.01); *D06P 1/48* (2013.01); *D06P 5/30* (2013.01); *D21H 19/36* (2013.01); *D21H 19/52* (2013.01); *D21H 19/72* (2013.01); *D21H 21/16* (2013.01); *C08K 13/08* (2013.01)

(58) Field of Classification Search
None
See application file for complete search history.

(56) References Cited

U.S. PATENT DOCUMENTS

| | | | | |
|---|---|---|---|---|
| 4,072,567 | A * | 2/1978 | Yokobayashi | C08B 37/0009 435/72 |
| 7,000,000 | B1 * | 2/2006 | O'Brien | C12P 19/08 536/123.12 |
| 8,197,641 | B2 | 6/2012 | Esser et al. | |
| 8,871,474 | B2 * | 10/2014 | Payne | C12Y 204/01005 435/97 |
| 2011/0189271 | A1 * | 8/2011 | Lad | A61K 9/14 424/451 |
| 2012/0132381 | A1 | 5/2012 | Hentze et al. | |
| 2014/0087431 | A1 * | 3/2014 | Payne | C12P 19/18 435/97 |
| 2016/0230348 | A1 | 8/2016 | Massouda | |
| 2016/0326268 | A1 * | 11/2016 | Cormier | C08B 37/0006 |

FOREIGN PATENT DOCUMENTS

WO   WO-2013163230 A2 * 10/2013 ............... C12P 7/06

* cited by examiner

*Primary Examiner* — Stefanie J Cohen

(57) ABSTRACT

The disclosure relates to a coating composition that can be applied to a substrate, especially a cellulose substrate. A layer of the coating composition applied to the substrate provides an excellent ink receptive layer and can be used as a coating on paper. The disclosure also relates to aqueous compositions and method for applying the layer of the coating composition onto the substrate.

18 Claims, No Drawings

WATER INSOLUBLE ALPHA-(1,3-GLUCAN) COMPOSITION

CROSS REFERENCE TO RELATED APPLICATIONS

This application is a continuation of U.S. application Ser. No. 15/756,681 (filed Mar. 1, 2018, now U.S. Pat. No. 10,731,297), which is the National Stage application of International Application No. PCT/US2016/58453 (filed Oct. 24, 2016), which claims the benefit of priority of U.S. Provisional Application No. 62/246,308 (filed Oct. 26, 2015), all of which prior applications are incorporated herein by reference in their entirety.

FIELD OF THE DISCLOSURE

The present disclosure is directed towards compositions comprising water insoluble α-(1,3→glucan) polymer and its use as an ink receiving layer for paper, plastic, and textiles. The use of the water insoluble α-(1,3→glucan) polymer produces fast-drying surfaces that provide sharp images that show very little bleeding or mottling after having been printed with ink from a printer, for example, ink jet printing.

BACKGROUND OF THE DISCLOSURE

The paper industry produces many different kinds of paper, depending upon its ultimate use. In many cases, the uncoated paper does not have sufficient properties to allow printing directly to the surface. For this reason, paper is often coated with one or more layers in order to render the surface receptive to inks. The coatings are generally made from starch, a thermoplastic polymer, a non-thermoplastic polymer or a combination thereof. Starch, however, tends to form a gelatinous slurry which can be difficult to work with and thermoplastics can be expensive and are not easily recyclable when applied to paper.

There are many requirements for an ink receiving layer, not only for paper, but for any printable surface, for example, plastic sheets and textiles. The ink receiving layer should have a high ink absorbing capacity, so that the dots will not flow out and will not be expanded more than is necessary to obtain a high optical density, even if ink droplet in a multi-color system may be superposed on the same physical spot. The ink receiving layer should have a high ink absorbing speed (short ink drying time) so that the ink droplets will not feather if smeared immediately after applying. The ink receiving layer should be excellent in color forming characteristics. The ink receiving layer must be readily wetted so that there is no "puddling", i.e. coalescence of adjacent ink dots, and an earlier absorbed ink drop should not show any "bleeding", i.e. overlap with neighboring or later placed dots. It must have a low haze-value and be excellent in transmittance properties.

After being printed, the image must have a good resistance to water, light, and/or time-dependent discoloration. The ink recording element may not show any curl or sticky behavior if stacked before or after being printed.

To meet these requirements, the ink receptive layers of the prior art have been prepared using many different materials. A dimensionally stable substrate such as polyethylene terephtalate (PET), cellulose triacetate, or paper is used most frequently and coated with one or more polymer coatings. There is a need for an ink receiving layer that can be coated onto multiple substrates and provide all of the properties that are needed for such a layer.

SUMMARY OF THE DISCLOSURE

The disclosure relates to a substrate, wherein at least a portion of the substrate is coated with a layer of a coating composition, the coating composition comprising;
  i) water insoluble α-(1,3→glucan) polymer having 90% or greater α-1,3-glycosidic linkages, less than 1% by weight of α-1,3,6-glycosidic branch points and a number average degree of polymerization in the range of from 55 to 10,000; and
  ii) at least one pigment, at least one binder or a combination thereof.

In other embodiments, the disclosure relates to a method of forming a layer of a coating composition on a substrate comprising:
  1) applying an aqueous coating composition to at least a portion of a substrate, wherein the aqueous coating composition comprises;
    i) water insoluble α-(1,3→glucan) polymer having 90% or greater α-1,3-glycosidic linkages, less than 1% of α-1,3,6-glycosidic branch points and a number average degree of polymerization in the range of from 55 to 10,000;
    ii) a pigment, a binder or a combination thereof;
    iii) an aqueous carrier; and
  2) removing at least a portion of the aqueous carrier from the applied layer of the aqueous coating composition to form the layer of the coating composition.

The disclosure further relates to the aqueous coating composition.

DETAILED DESCRIPTION OF THE DISCLOSURE

The disclosures of all cited patent and non-patent literature are incorporated herein by reference in their entirety.

As used herein, the term "embodiment" or "disclosure" is not meant to be limiting, but applies generally to any of the embodiments defined in the claims or described herein. These terms are used interchangeably herein.

Unless otherwise disclosed, the terms "a" and "an" as used herein are intended to encompass one or more (i.e., at least one) of a referenced feature.

The features and advantages of the present disclosure will be more readily understood by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

The term "starch" means a polymeric carbohydrate consisting of amylose and amylopectin.

The term "hydroxyalkyl starch" means an ether derivative of partially hydrolyzed natural starches, in which hydroxyl groups in the starch are hydroxyl alkylated.

The phrase "water insoluble" means that less than 5 grams of the α-(1,3→glucan) polymer dissolves in 100 milliliters of water at 23° C. In other embodiments, water insoluble means that less than 4 grams or 3 grams or 2 grams or 1 grams of the polymer is dissolved in water at 23° C.

The phrase "α-(1,3→glucan) polymer" means a polysaccharide comprising glucose monomer units linked together by glycosidic linkages wherein at least 50% of the glycosidic linkages are α-1,3-glycosidic linkages. In other embodiments, the percentage of α-1,3-glycosidic linkages can be greater than or equal to 90%, 95%, 96%, 97%, 98%, 99% or 100% (or any integer value between 50% and 100%). Accordingly, the α-(1,3→glucan) polymer comprises less than or equal to 10%, 5%, 4%, 3%, 2%, 1% or 0% of glycosidic linkages that are not α-1,3-glycosidic linkages.

The terms "glycosidic linkage" refers to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. Herein, "alpha-D-glucose" will be referred to as "glucose".

The phrase "coating composition" refers to all of the solid components that form the layer on the substrate, for example, the α-(1,3→glucan) polymer, pigment, as well as optional surfactant, dispersing agent, binder, crosslinking agent, and/or other additives. The term solid is used even though some of the components may be liquids at or below room temperature.

The phrase "aqueous coating composition" refers to the coating composition further comprising an aqueous carrier. After being applied to a substrate, at least a portion of the aqueous carrier is removed to form the desired layer of the coating composition on the substrate. Removing at least a portion of the aqueous carrier means to remove greater than or equal to 50% by weight of the aqueous carrier. In other embodiments, greater than or equal to 90% or 95% or 99% by weight of the aqueous carrier is removed. Water content can be assessed by Karl Fischer titration.

The phrase "consists essentially of" means that the composition contains all of the recited components and less than 5% by weight, based on the total weight of the composition of any other component or combination of components. For example, a composition consisting essentially of A and B must contain at least 95% by weight of A and B and no more than 5% by weight of any other component or combination components, wherein the percentage by weight is based on the total weight of the composition. In other embodiments, the phrase consisting essentially of means that the composition contains less than 4% or 3% or 2% or 1% or less than 0.5% by weight of the components that are not recited, based on the total weight of the composition.

In some embodiments, the present disclosure relates to a substrate, wherein at least a portion of the substrate is coated with a layer of a coating composition, the coating composition comprising:
i) water insoluble α-(1,3→glucan) polymer having 90% or greater α-1,3-glycosidic linkages, less than 1% of α-1,3,6-glycosidic branch points and a number average degree of polymerization in the range of from 55 to 10,000; and
ii) a pigment, a binder or a combination thereof.

The present disclosure also relates to a method of forming a layer of a coating composition on a substrate comprising:
1) applying a layer of an aqueous coating composition to at least a portion of a substrate, wherein the aqueous coating composition comprises;
   i) water insoluble α-(1,3→glucan) polymer having 90% or greater α-1,3-glycosidic linkages, less than 1% of α-1,3,6-glycosidic branch points and a number average degree of polymerization in the range of from 55 to 10,000;
   ii) a pigment, a binder or a combination thereof; and
   iii) an aqueous carrier; and
2) removing at least a portion of the aqueous carrier from the applied layer of the aqueous coating composition to form the layer of the coating composition.

The water insoluble α-(1,3→glucan) polymer can be produced using an enzymatic method, for example, a method using glucosyl transferase enzymes as provided by U.S. Pat. No. 7,000,000 or U.S. Pat. No. 8,871,474. In some embodiments, the water insoluble α-(1,3→glucan) polymer is produced by a glucosyltransferase enzyme having 90% or greater sequence identity to Gtf J. An enzymatic production of the water insoluble α-(1,3→glucan) polymer can result in a number average degree of polymerization (DPn) in the range of from 55 to 10,000. In other embodiments, the DPn can be in the range of from 75 to 1,000 and, in still further embodiments, in the range of from 100 to 800. The number average degree of polymerization can be determined by size exclusion chromatography.

The enzymes disclosed in the above references are also particularly useful for producing water insoluble fiber having greater than or equal to 90% α-1,3-glycosidic linkages. The water insoluble α-(1,3→glucan) polymer comprising greater than or equal to 90% α-1,3-glycosidic linkages is herein to be considered a linear polymer having a homogeneous structure. By homogeneous structure is meant that the water insoluble α-(1,3→glucan) polymer has less than 10% linkages that are not α-1,3-glycosidic linkages, for example, α-1,6-glycosidic linkages α-1,4-glycosidic linkages or α-1,3,6-glycosidic branch points. In other embodiments, the water insoluble α-(1,3→glucan) polymer comprises less than 9% or 8% or 7% or 6% or 5% or 4% or 3% or 2% or 1% of glycosidic linkages that are not α-1,3-linkages. In still further embodiments, the water insoluble α-(1,3→glucan) polymer is a linear polymer having greater than or equal to 99% of α-1,3-glycosidic linkages and less than 1% α-1,3,6-glycosidic branch points. As used herein the percentage of α-1,3-glycosidic linkages refers to the average number of monomer units that are linked via α-1,3-linkages divided by the total number of monomer units in the polymer composition (×100). The percentage of α-1,3-glycosidic linkages is determined via integration of the peaks in a $^1$H NMR spectra, wherein a sample of the water insoluble α-(1,3→glucan) polymer is solvated in $d_6$-dimethyl sulfoxide (DMSO) containing 3 percent by weight LiCl and 0.1 milliliters of trifluoroacetic acid in $d_6$-DMSO. The percentages of linkages that are not α-1,3-glycosidic linkages can be determined in the same manner and using the same general formula.

It is important that the α-(1,3→glucan) polymer is water insoluble. The aqueous coating composition that is applied to the substrate is a dispersion of the water insoluble α-(1,3→glucan) polymer in water. When applied to at least a portion of the substrate and the applied layer is dried, the layer of coating composition comprises an average pore size volume in the range of from 0.1 to 0.50 milliliters/gram (ml/g), as measured by mercury porosimetry. In other embodiments, the average pore size volume can be in the range of from 0.12 to 0.45 or 0.14 to 0.40 ml/g. In contrast, a water soluble polysaccharide composition, when applied to a substrate, forms a continuous layer that does not have pores or voids on the same scale as the water insoluble α-(1,3→glucan) polymer. The phrase "discontinuous layer" means a layer with individual particles wherein a free standing layer of the material has an elongation to break of less than 5%.

The water insoluble α-(1,3→glucan) polymer can comprise in the range of from 0.1% to about 50% by weight based on the total amount of the coating composition. In other embodiments, the water insoluble α-(1,3→glucan) polymer can comprise in the range of from 1% to 45% or 2% to 40% or 3% to 35% or 3% to 30% by weight of the water insoluble α-(1,3→glucan) polymer, wherein all percentages by weight are based on the total weight of the coating composition.

The coating composition also comprises at least one pigment, at least one binder, or a combination thereof. In some embodiments, the coating composition comprises the water insoluble α-(1,3→glucan) polymer and a pigment. In some embodiments, the coating composition consists essentially of the water insoluble α-(1,3→glucan) polymer and a pigment. In some embodiments, the coating composition comprises the water insoluble α-(1,3→glucan) polymer and a binder. In other embodiments, the coating composition consists essentially of the water insoluble α-(1,3→glucan) polymer and a binder. In some embodiments, the coating composition comprises the water insoluble α-(1,3→glucan) polymer, a pigment, and a binder. In other embodiments, the coating composition consists essentially of the water insoluble α-(1,3→glucan) polymer, a pigment, and a binder.

The coating composition can comprise the water insoluble α-(1,3→glucan) polymer and a pigment. One or more pigments can be included in the coating compositions. Suitable pigments can include, for example, titanium dioxide, calcium carbonate, clays such as kaolin, structured and calcined clays, hydrated aluminum silicates, bentonite, natural and synthetic calcium carbonate, calcium sulphate (gypsum), calcium silicate, calcium silicate hydrate, silicas, precipitated silicas, fumed silicas, alumina, aluminum trihydrate, plastic (polystyrene) pigments, satin white, talc, barium sulphate, zinc oxide, or a combination thereof. In some embodiments, the pigment is calcium carbonate, crystalline silica, amorphous silica, titanium dioxide calcium silicate, or a combination thereof. The pigment can be present in the range of from 10 to 75% by weight, based on the total weight of the coating composition. In other embodiments, the pigment can be present in the range of from 20 to 70% by weight or 25 to 65% by weight, based on the total weight of the coating composition.

The coating composition can comprise the water insoluble α-(1,3→glucan) polymer and a binder. The binder can comprise in the range of from 1 to 50% by weight of the coating composition, based on the total weight of the coating composition. In other embodiments, the binder can comprise in the range of from 2 to 45% or 2 to 40% or 2 to 30% by weight of the coating composition, wherein the percentages by weight are based on the total weight of the coating composition. One or more binders can be included in the coating compositions. Suitable binders can include, for example, polyvinyl alcohol, polyvinyl acetate, partially saponified polyvinyl acetate, silanol-modified polyvinyl alcohol, polyurethane, starch, corn dextrin, carboxy methyl cellulose, cellulose ethers, hydroxyethyl cellulose, hydroxypropyl cellulose, ethylhydroxyethyl cellulose, methyl cellulose, alginates, sodium alginate, xanthan, carrageenan, casein, soy protein, guar gums, synthetic polymers, styrene butadiene latex, styrene acrylate latex, or a combination thereof. In some embodiments, the binder is polyvinyl alcohol, polyvinyl acetate, partially saponified polyvinyl acetate, silanol-modified polyvinyl alcohol, polyurethane, starch, corn dextrin, cellulose ethers, hydroxyethyl cellulose, hydroxypropyl cellulose, ethylhydroxyethyl cellulose, methyl cellulose, alginates, sodium alginate, xanthan, carrageenan, guar gums, synthetic polymers, styrene butadiene latex, or a combination thereof. In some embodiments, the binder is polyvinyl alcohol. In other embodiments, the binder is a combination of two or more of polyvinyl alcohol, a silanol-modified polyvinyl alcohol and polyvinyl acetate. If present, the coating composition can comprise up to 50% by weight of the binder, wherein the percentage by weight is based on the total amount of the coating composition. In some embodiments, the coating composition is free from the binder. In other embodiments, the coating composition is free from starch and/or hydroxyalkyl starch. In other embodiments, the coating composition is free from water soluble polysaccharides. As used herein, the phrase free from means that the coating composition contains less than 1% by weight of the component, or less than 0.5% by weight or less than 0.1% by weight or less than 0.01% by weight of the component. In still further embodiments, free from means that the particular component is undetectable by $^1$H NMR.

The coating composition can further comprise iv) an additive. One or more of each of these components can be added. For example, the additives category encompasses a large number of potential components of which one or more of the individual components can be used. In some embodiments, a pigment and/or a binder, and one or more additives can be used. In other embodiments, the coating composition can include a pigment and one or more additives without the addition of a binder. In still further embodiments, the coating composition can include a binder and one or more additives without the addition of a pigment.

The coating composition can further comprise any of the additives that are normally used in paper coatings. Suitable additives can include, for example, dispersants, quaternary ammonium salts, calcium chloride, calcium silicate; surfactants, for example, cationic surfactants, anionic surfactants, non-ionic surfactants, amphoteric surfactants, fluorinated surfactants; hardeners, for example, active halogen compounds, vinylsulfone compounds, epoxy compounds; dispersing agents, for example, polyacrylates, polyphosphates, polycarboxylates, flowability improvers; lubricants, for example, calcium, ammonium and/or zinc stearate, wax or wax emulsions, alkyl ketene dimer, glycols; antifoam agent, for example, octyl alcohol, silicone-based antifoam agents; releasing agents; foaming agents; penetrants, for example, 1,2-propanediol, triethylene glycol butyl ether, 2-pyrrolidone; optical brighteners, for example, fluorescent whiteners; preservatives, for example, benzoisothiazolone and isothiazolone compounds; biocides, for example, metaborate, thiocyanate, sodium benzoate, benzisothiaolin-3-one; yellowing inhibitors, for example, sodium hydroxymethyl sulfonate, sodium p-toluenesulfonate; ultraviolet absorbers, for example, benzotriazole compounds; antioxidants, for example, sterically hindered phenol compounds; insolubilisers; antistatic agents; pH regulators, for example, weak bases, primary, secondary or tertiary amines, sulfuric acid, hydrochloric acid; water-resistance agents, for example, ketone resin, anionic latex, glyoxal; wet and/or dry strengthening agents, for example, glyoxal-based resins, oxidized polyethylenes, melamine resins, urea formaldehyde; cross-linking agents; gloss-ink holdout additives; grease and oil resistance additives; leveling aids, for example, polyethylene emulsions, alcohol/ethylene oxide or combinations thereof. In some embodiments, the coating composition further comprises one or more of an additive, wherein the additive is one or more of a dispersant, a quaternary ammonium salts, calcium chloride, a surfactant, a hardener, a flowability improver, a lubricant, an antifoam, a releasing agent, a foaming agent, a penetrant, an optical brightener, a preservative, a biocide, a yellowing inhibitor, an ultraviolet absorber, an antioxidant, an insolubiliser, an antistatic agent, a pH regulator, a water-resistance agent, a wet and/or dry strengthening agent, a cross-linking agent, a gloss-ink holdout additive, a grease and oil resistance additive, a leveling aid, or a combination thereof. The coating composition can contain any one or more of the listed additives in an amount in the range of from 0 to 5% by weight, based on the total amount of the coating composition. In other embodiments, the additives can be present in an amount in the range of from 0.1 to 4% by weight or 0.5 to 3.5% by weight or 0.5 to 3% by weight. All percentages by weight are based on the total amount of the coating composition.

The individual components of the coating composition can be dispersed in an aqueous carrier to form the aqueous coating composition. As used herein, aqueous carrier means a liquid carrier comprising greater than or equal to 50% by weight of water. In other embodiments, the aqueous carrier comprises greater than or equal to 75% or 85% or 90% or 95% water, all percentages by weight are based on the total amount of the aqueous carrier. Volatile non-aqueous solvents may be present, for example alcohols or other organic solvents, however, it is expected that the amount of the non-aqueous carriers will be low when compared to the amount of water present in the aqueous coating composition. The amount of aqueous carrier in the aqueous coating composition less than or equal to 95% by weight, based on the total weight of the aqueous coating composition. In other embodiments, the aqueous carrier is present at less than or equal to 90% or 85% or 80% or 75% or 70% or 65% or 60% or 55% or 50% or 40% or 30% or 20% by weight, based on the total weight of the aqueous coating composition. In general, the aqueous coating composition should have a viscosity that allows a relatively smooth coating to be applied to the surface of the substrate without lumps, voids, or streaking. Such application details are well-known to one of ordinary skill in the art.

The aqueous coating composition can be formed using standard methods known in the art. For example, the dry ingredients can be added to water either all at once, in batches, or one after the other. For example, pigments, with any additives, can be mixed with the aqueous carrier first, followed by the addition of the water insoluble α-(1,3→glucan) polymer as a powder or as a wet cake. In other embodiments, the components of the coating composition can be dry-blended to form a pre-mix which can then be added to the aqueous carrier. The aqueous coating composition should be mixed thoroughly, in order to form a dispersion of the water-insoluble α-(1,3→glucan) polymer.

The present disclosure also relates to a method of forming a layer of a coating composition on a substrate comprising:

1) applying a layer of an aqueous coating composition to at least a portion of a substrate, wherein the aqueous coating composition comprises;
   i) water insoluble α-(1,3→glucan) polymer having 90% or greater α-1,3-glycosidic linkages, less than 1% of α-1,3,6-glycosidic branch points and a number average degree of polymerization in the range of from 55 to 10,000;
   ii) a pigment, a binder or a combination thereof; and an aqueous carrier; and
2) removing at least a portion of the aqueous carrier from the applied layer of the aqueous coating composition to form the layer of the coating composition.

The step of applying the layer of the aqueous coating composition to at least a portion of the substrate can be accomplished by any means known in the art. The substrate can be a cellulose substrate, a polymer, paper, a textile, paperboard, cardboard, or corrugated board. In some embodiments, the polymer substrate can be a transparency sheet, for example comprising cellulose acetate, polyester, or polyvinyl chloride.

Methods of applying the layer of the aqueous coating composition can include, for example, air knife coating, rod coating, bar coating, wire bar coating, spray coating, brush coating, cast coating, flexible blade coating, gravure coating, jet applicator coating, short dwell coating, slide hopper coating, curtain coating, flexographic coating, size-press coating, reverse roll coating and transfer roll coating. The aqueous coating composition can be applied on at least a portion of the substrate, for example, on a single side or both sides of the substrate, a portion of a single side, or a portion of both sides of a flat substrate. The aqueous coating can be applied once to the substrate or multiple times to the substrate.

In other embodiments, the aqueous coating composition can be applied to the substrate either shortly before or during the printing operation. For example, a printing machine such as an ink jet printer, may be equipped to apply a layer of the aqueous coating composition to a portion of the paper that will receive the ink prior to placing the ink on the substrate. The layer of coating composition applied in this manner can be the same size as the to-be-applied ink or can be larger than the to-be-applied ink.

After the coating step, at least a portion of the water is removed by any method known in the art. For example, air or convection drying, linear tunnel drying, arc drying, air-loop drying, contact or conduction drying, radiant energy drying, infrared drying, microwave drying, or a combination thereof may be used. The coated substrate can optionally be calendared after drying in order to improve the surface smoothness and gloss. Calendaring can be carried out by passing the coated substrate through nips and rollers one or more times.

The aqueous coating composition can be applied to the substrate at such a rate as to apply a dry coating weigh in the range of from 0.1 to 30 grams/meter$^2$ (g/m$^2$). In other embodiments, the dry coating weight can be in the range of from 0.5 to 25 g/m$^2$ or 1 to 20 g/m$^2$. The applied layer of coating composition can have a thickness in the range of from 0.1 to 50 micrometers (μm). In other embodiments, the thickness can be in the range of from 0.5 to 40 μm or 1 to 30 μm or 1 to 20 μm.

Non-limiting examples of the embodiments disclosed herein include:
1. A substrate, wherein at least a portion of the substrate is coated with a layer of a coating composition, the coating composition comprising;

i) water insoluble α-(1,3→glucan) polymer having 90% or greater α-1,3-glycosidic linkages, less than 1% by weight of α-1,3,6-glycosidic branch points and a number average degree of polymerization in the range of from 55 to 10,000; and ii) at least one pigment, at least one binder or a combination thereof.

2. The substrate of embodiment 1 wherein the substrate is a cellulose substrate, a polymer, paper, a textile, paperboard, cardboard, or corrugated board.

3. The substrate of any one of embodiments 1 or 2 wherein the layer of coating composition comprises an average pore size diameter in the range of from 0.10 to 0.50 milliliters/gram.

4. The substrate of any one of embodiments 1, 2 or 3 wherein the binder is polyvinyl alcohol, polyvinyl acetate, partially saponified polyvinyl acetate, silanol-modified polyvinyl alcohol, polyurethane, starch, corn dextrin, carboxy methyl cellulose, cellulose ethers, hydroxyethyl cellulose, hydroxypropyl cellulose, ethylhydroxyethyl cellulose, methyl cellulose, alginates, sodium alginate, xanthan, carrageenan, casein, soy protein, guar gums, synthetic polymers, styrene butadiene latex, styrene acrylate latex, or a combination thereof.

5. The substrate of any one of embodiments 1, 2, 3 or 4 wherein the coating composition comprises in the range of from 0.1 to 50% by weight of the water insoluble α-(1,3→glucan) polymer, wherein the percentage by weight is based on the total weight of the coating composition.

6. The substrate of any one of embodiments 1, 2, 3, 4 or 5 wherein the coating composition further comprises one or more of:

iv) an additive.

7. The substrate of claim 1 wherein the water insoluble α-(1,3→glucan) polymer is a linear polymer having greater than or equal to 99% of α-1,3-glycosidic linkages and less than 1% α-1,3,6-glycosidic branch points.

8. The substrate of any one of embodiments 1, 2, 3, 4, 5 or 6 wherein the coating composition is free from or essentially free from starch and/or hydroxyalkyl starch.

9. The substrate of any one of embodiments 1, 2, 3, 4, 5, 6, 7 or 8 wherein the binder is polyvinyl alcohol, polyvinyl acetate, partially saponified polyvinyl acetate, silanol-modified polyvinyl alcohol, polyurethane, starch, corn dextrin, cellulose ethers, hydroxyethyl cellulose, hydroxypropyl cellulose, ethylhydroxyethyl cellulose, methyl cellulose, alginates, sodium alginate, xanthan, carrageenan, guar gums, synthetic polymers, styrene butadiene latex or a combination thereof.

10. The substrate of any one of embodiments 6, 7 8 or 9 wherein the additive is one or more of a dispersant, a quaternary ammonium salts, calcium chloride, a surfactant, a hardener, a flowability improver, a lubricant, an antifoam, a releasing agent, a foaming agent, a penetrant, an optical brightener, a preservative, a biocide, a yellowing inhibitor, an ultraviolet absorber, an antioxidant, an insolubiliser, an antistatic agent, a pH regulator, a water-resistance agent, a wet and/or dry strengthening agent, a cross-linking agent, a gloss-ink holdout additive, a grease and oil resistance additive, a leveling aid, or a combination thereof.

11. An aqueous coating composition comprising the coating composition of any one of embodiments 1, 2, 3, 4, 5, 6, 7, 8, 9 or 10 and iii) an aqueous carrier.

12. The aqueous coating composition of embodiment 11 wherein the α-(1,3→glucan) polymer is produced by a glucosyltransferase enzyme having 90% or greater sequence identity to Gtf J.

13. The aqueous coating composition of any one of embodiments 11 or 12 wherein the aqueous coating composition is free from water soluble polysaccharides.

14. The aqueous coating composition of any one of embodiments 11, 12 or 13 wherein the aqueous carrier comprises less than or equal to 60% by weight of the total weight of the aqueous coating composition.

15. The aqueous coating composition of any one of embodiments 11, 12, 13 or 14 wherein the composition further comprises one or more of:

iv) an additive.

16. The aqueous coating composition of any one of embodiments 11, 12, 13, 14 or 15 wherein the composition is essentially free from starch and/or hydroxyalkyl starch.

17. The aqueous coating composition of any one of embodiments 11, 12, 13,1 4, 15 or 16 wherein the α-(1,3→glucan) polymer is a linear polymer having greater than or equal to 99% of α-1,3-glucosydic linkages and less than 1% α-1,3,6-branching points.

18. The aqueous coating composition of any one of embodiments 11, 12, 13, 14, 15, 16 or 17 wherein the binder is polyvinyl alcohol, polyvinyl acetate, partially saponified polyvinyl acetate, silanol-modified polyvinyl alcohol, polyurethane, starch, corn dextrin, cellulose ethers, hydroxyethyl cellulose, hydroxypropyl cellulose, ethylhydroxyethyl cellulose, methyl cellulose, alginates, sodium alginate, xanthan, carrageenan, guar gums, synthetic polymers, styrene butadiene latex or a combination thereof.

19. The aqueous composition of any one of embodiments 15, 16, 17 or 18 wherein the additive is one or more of a dispersant, a quaternary ammonium salts, calcium chloride, a surfactant, a hardener, a flowability improver, a lubricant, an antifoam, a releasing agent, a foaming agent, a penetrant, an optical brightener, a preservative, a biocide, a yellowing inhibitor, an ultraviolet absorber, an antioxidant, an insolubiliser, an antistatic agent, a pH regulator, a water-resistance agent, a wet and/or dry strengthening agent, a cross-linking agent, a gloss-ink holdout additive, a grease and oil resistance additive, a leveling aid or a combination thereof.

20. A method of forming a layer of a coating composition on a substrate comprising:

1) applying an aqueous coating composition to at least a portion of a substrate, wherein the aqueous coating composition comprises;
   i) water insoluble α-(1,3→glucan) polymer having 90% or greater α-1,3-glycosidic linkages, less than 1% of α-1,3,6-glycosidic branch points and a number average degree of polymerization in the range of from 55 to 10,000;
   ii) a pigment, a binder or a combination thereof;
   iii) an aqueous carrier; and
2) removing at least a portion of the aqueous carrier from the applied layer of the aqueous coating composition to form the layer of the coating composition.

21. The method of embodiment 20 wherein the a) α-(1,3→glucan) polymer is synthesized by a glucosyltransferase enzyme having 90% or greater identity to Gtf J.

22. The method of any one of embodiments 20 or 21 wherein the substrate is paper or a polymer.

23. The method of any one of embodiments 20, 21 or 22 wherein the aqueous coating composition further comprises:
    iv) an additive.
24. The method of any one of embodiments 20, 21, 22 or 23 wherein the applied layer of coating composition, after having at least a portion of the water removed, forms a surface having an average porosity in the range of from 0.10 to 0.50 milliliters/gram.

EXAMPLES

Unless otherwise noted, all ingredients are available from Sigma-Aldrich, St. Louis, Mo.

Silica #1, having a pore volume of 1.8 ml/g and Silica #2, amorphous silica, having a pore volume of 1.2 ml/g are both available from the PQ Corporation, Valley Forge, Pa.

PVOH #1, partially saponified PVOH, PVOH #2, silanol-modified PVOH and PVOH #3 polyvinyl alcohol are available from Kuraray Europe GmbH, Germany.

PVAc, vinyl acetate emulsion and Aminomethacrylate-based quaternary copolymer are both available from Indulor Chemie GmbH, Germany.

HYDROCARB® 60 and HYDROCARB® 90 calcium carbonates are available from Omya Incorporated, Proctor, Vt.

Calcium Silicate is available from Cirkel GmbH & Co, Haltern, Germany.

The water insoluble α-(1,3→glucan) polymer was produced according to a method of U.S. Pat. No. 8,871,474. The polymer had a number average degree of polymerization of about 300 and >98% α-1,3 glycosidic linkages.

SURFYNOL® 465 nonionic surfactant and other nonionic organic wetting agents are available from Air Products, Allentown, Pa.

Corn dextrin is available from Cargill, Wayzata, Minn.

PROXEL® GXL antimicrobial is available from Arch Chemicals, Inc., Smyrna, Ga.

Pore Size Volume was measured using a POREMASTER® GT pore size analyzer, available from Quantachrome Instruments, Boynton Beach, Fla.

Coating Compositions 1-4

Coating compositions 1-4 were produced by dispersing compositions in water according to the Table 1. The amounts in Table 1 are parts by weight.

TABLE 1

|  | Coating Composition | | | |
| --- | --- | --- | --- | --- |
|  | 1 | 2 | 3 | 4 |
| Silica #1 | 75 | 50 | 65 | 50 |
| Silica #2 | 5 | 18 | 18 | 18 |
| α-(1,3→glucan) polymer | 13 | 25 | 10 | 25 |
| Dispersing agent | 7 | 7 | 7 | 7 |
| PVOH #1 | 13 | 13 | 13 | 13 |
| PVOH #2 | 21 | 21 | 21 | 21 |
| PVAc | 50 | 50 | 50 | 40 |
| quaternary copoly. | 5.9 | 5.9 | 5.9 | 5.9 |
| CaCl$_2$ | 4.1 | 4.1 | 4.1 | 4.1 |

Coating Compositions 5, 6, 7 and Comparative Coating Compositions A and B

Coating compositions 5, 6, and 7 and Comparative coating compositions A and B were also prepared by dispersing the ingredients of Table 2 in water. The amounts in Table 2 are parts by weight.

TABLE 2

|  | Coating Compositions | | | | |
| --- | --- | --- | --- | --- | --- |
| Ingredient | 5 | 6 | A | 7 | B |
| α-(1,3→glucan) polymer | 15 | 7 | 0 | 30 | 0 |
| PVOH #3 | 0 | 15 | 15 | 0 | 0 |
| HC 60 | 70 | 93 | 70 | 0 | 0 |
| HC 90 | 0 | 0 | 0 | 70 | 100 |
| Calcium Silicate | 15 | 0 | 30 | 0 | 0 |
| Nonionic wetting agent | 0 | 0.1 | 0.1 | 0 | 0 |
| corn dextrin | 0 | 0 | 0 | 15 | 15 |

The aqueous coating compositions of Table 1 and 2 were applied to ink jet paper and dried. The dried coatings were then fed through an ink jet printer printing a 600 dots per inch (dpi), 900 dpi, and 1200 dpi to visually analyze the print quality using a rating scale of A, B, C, D, or F with A being the highest visual quality and F being the lowest visual quality. In a second test, 1.7 seconds after the ink was applied to the coating composition, the ink was wiped and the wiped area was visually analyzed and given a rating of A, B, C, D or F, with A being the best rating and F being the worst rating (i.e., the most smudged). In Table 3, a rating of a "u" means that the smudge rendered the ink unidentifiable. The results are shown in Table 3. The abbreviation "n/a" means not analyzed.

TABLE 3

|  | Coating Composition | | | | | | | | |
| --- | --- | --- | --- | --- | --- | --- | --- | --- | --- |
|  | 1 | 2 | 3 | 4 | A | 5 | 6 | B | 7 |
| Coating weight (g/m$^2$) | 6.7 | 5.7 | 6.5 | 6.2 | 7.0 | 7.1 | 7.1 | 8.1 | 8.3 |
| Coating thickness (μm) | 17.9 | 19.1 | 18.2 | 19.1 | 2.9 | 5.7 | 6.4 | 5.4 | 7.0 |
| Pore Size Volume (ml/g) | n/a | n/a | n/a | n/a | 0.44 | 0.28 | n/a | 0.28 | 0.18 |
| Non-wiped rating (600 dpi) | A | A | A | A | A | A | A | A | A |
| Wiped rating (600 dpi) | A | A | A | A | A | A | A | F | A |
| Non-wiped rating (900 dpi) | A | A | A | A | A | A | A | A | A |
| Wiped rating (900 dpi) | A | D | B | A | B | A | B | u | C |
| Non-wiped rating (1200 dpi) | A | A | A | A | A | A | C | A | B |
| Wiped rating (1200 dpi) | F | F | F | F | F | C | F | u | F |

Preparation of Coating Composition 8

A dispersion comprising 3 parts by weight (pbw) of the water insoluble α-(1,3→glucan) polymer, 5 pbw 1,2-propanediol, 1 pbw triethylene glycol butyl ether, 10 pbw glycerol, 3 pbw 2-pyrrolidone, 0.15 pbw PROXEL® GXL antimicrobial, 0.5 pbw SURFYNOL® surfactant and 1 pbw polyurethane was mixed with 76.35 pbw water.

A dispersion of aqueous Coating Composition 8 was applied to a transparency sheet and the coating was dried. The coated transparency sheet was placed in an ink jet printer and printed using color ink. As a comparison, an uncoated transparency sheet was also printed with the same image. The coated transparency sheet showed sharp images and no evidence of mottling. In comparison, the uncoated transparency sheet showed an unacceptable degree of bleeding and mottling.

Preparation of Coating Compositions 9 and 10, and Comparative Coating Composition C The following examples show coating performance for Folding Box Boards (FBB) and Label applications where coating compositions comprising water insoluble α-(1,3→glucan) polymer were formulated to improving printing performance while preserving other key paper parameters such as brightness and opacity.

Coating compositions 9 and 10 and Comparative Coating Composition C (Comp. C) were prepared by dispersing the ingredients of Table 4 in water. The amounts in Table 4 are parts by weight. These coating compositions were coated onto Folding Box Boards.

TABLE 4

| | Coating Composition | | |
|---|---|---|---|
| Ingredient | Comp. C | 9 | 10 |
| Pigment | | | |
| Hydroplex 90 carbonate | 35 | 35 | 35 |
| Hydroplex 60 carbonate | 65 | 60 | 60 |
| α-(1,3→glucan) polymer | 0 | 5 | 10 |
| Binder | | | |
| Litex 9740 (styrol butadiene latex) | 12 | 12 | 12 |
| Mowiol 4-88 (11%-Lösung) | 0.5 | 0.5 | 0.5 |
| Property | | | |
| Viscosity (mPas) | 450 | 450 | 450 |
| Solids Content (%) | 45 | 45 | 45 |
| Coating Weight (g/m$^2$) | 10.9 | 11.8 | 12.4 |

Coating procedure: All coating was performed on Sumet coating unit in blade coating mode with bent blade. Blade angle was 25°, Blade pressure was 25 N, Roll pressure was 25 N and machine speed was 20 m/min.

Bristow wheel method and High speed fluid characterization: a defined volume of ink is dispensed onto the substrate. It gives a track of the ink which is longer if the setting speed is low. For inkjet applications it is important to have a track of shorter than 150 mm.

For the FBB-samples it is important to improve opacity of the coating relative to pure uncoated board and to improve printability relative to precipitated calcium carbonate (PCC) coating. Whiteness was determined once with UV-component in the light source and once without.

The change in coating opacity when applying a standard varnish onto the sample was checked. The setting speed of ink on the coated samples was probed by means of Bristow wheel. Binding power of the coating was also checked by means of a pick test (ISO 3783). All coating compositions were set to the same solids content (45%). To highlight the effect of the polysaccharide, the relative increase in whiteness (ISO 2470-1 and 2470-2) for all the samples is shown. The results in Table 5 show that the polysaccharide is behaving quite similarly to calcium carbonate pigments. By exchanging pigment by polysaccharide one obtains the same increase in whiteness. To check the opacity of the coating further, a thin film of standard varnish was applied from offset printing (Actega Terrawet). Whiteness decreased by about 8 points for all samples. Hence, coating containing parts of polysaccharide have comparable brightness properties to other pigments. To determine the binding power of the coating to the substrate we performed pick test, where medium viscosity oil was applied onto the surface and pulled with increasing speed. Higher values show a higher binding power to the substrate. The values in Table 5 indicate that coating adhesions were not affected by the presence of polysaccharide.

Setting speed was tested by Bristow wheel method. The results in Table 5 show that increasing the amount of polysaccharide in the coating gives a decrease in the track length and an increase in the setting speed. The shorter track length compared to that of the reference sample (Comparative Coating Composition C) indicate that the use of polysaccharide yielded improved printability while preserving key coating characteristics of whiteness and pick strength.

TABLE 5

| Coating Composition | Description | Coating (g/m$^2$) | Whiteness D 65 | Increase in whiteness | Increase in whiteness per 10 g/m$^2$ | Track length (mm) | Pick Test |
|---|---|---|---|---|---|---|---|
| Control | Pure board | — | 42.24 | — | — | — | — |
| Comp. C | Control without polysaccharide | 10.9 | 57.13 | 11.88 | 10.90 | 112 | 2.59 |
| 9 | 5 parts of polysaccharide | 11.8 | 57.95 | 12.70 | 10.76 | 99 | 2.47 |
| 10 | 10 parts of polysaccharide | 12.4 | 58.97 | 13.72 | 11.06 | 92 | 2.82 |

In Label application it is important to have a high opacity, even when the paper gets wet. Furthermore printability matters, so the setting behavior of model ink at the coated samples was investigated. The composition with polysaccharide (Coating Composition 11) was compared with compositions having three different TiO$_2$ controls (Comparative Coating Compositions D, E, and F).

Coating composition 11 and Comparative Coating Compositions D, E, and F (Comp. D, Comp. E, and Comp. F) were prepared by dispersing the ingredients of Table 6 in water. The amounts in Table 6 are parts by weight. These coating compositions were coated onto labels as described above.

TABLE 6

| Ingredient | Coating Composition | | | |
|---|---|---|---|---|
| | Comp. D | 11 | Comp. E | Comp. F |
| Pigment | | | | |
| Hydroplex 90 carbonate | 78 | 75 | 78 | 78 |
| Hydragloss 90 clay | 15 | 15 | 15 | 15 |
| TiO$_2$ (SR5 Slurry) | 7 | — | — | — |
| TiO$_2$ Slurry Alternative A | — | — | 7 | — |
| TiO$_2$ Slurry Alternative B | — | — | — | 7 |
| α-(1,3→glucan) polymer | — | 10 | — | — |
| Binder | | | | |
| Litex 9740 (styrol butadiene latex) | 12 | 12 | 12 | 12 |
| Property | | | | |
| Viscosity (mPas) | 1000 | 1000 | 1000 | 1000 |
| Solids Content (%) | 45 | 45 | 45 | 45 |
| Coating Weight (g/m$^2$) | 9.4 | 8.8 | 7.6 | 8.7 |

Table 7 shows the obtained data from whiteness and opacity measures. The substrate contains optical brightening agent (OBA) which gives a high D65 whiteness. Since whiteness without UV part of the light ignores OBA and is comparable between all samples we have a direct measure for the opacity. The difference in D65 values. The data in Table 7 shows that coating formulations containing polysaccharide show comparable whiteness (ISO 2470-1 and 2470-2) and wet opacity (DIN 53146) as TiO$_2$-containing formulation. Moreover, the Bristow length measurement shows again that formulations containing polysaccharide give the fastest setting speed and hence the shortest setting time (the shortest track length in Bristow).

TABLE 7

| Coating Composition | Description | Coating (g/m$^2$) | Whiteness D65 | Whiteness 420 (without OBA) | Opacity wet | Bristow length (mm) |
|---|---|---|---|---|---|---|
| Control | Uncoated substrate | | 109.34 | 87.96 | 60.56 | |
| Comp. D | Reference TiO$_2$ | 9.4 | 97.44 | 88.43 | 71.54 | 134.6 |
| 11 | 10 parts of polysaccharide | 8.8 | 103.77 | 87.56 | 71.97 | 123 |
| Comp. E | Reference TiO$_2$ | 7.6 | 99.92 | 88.46 | 70.75 | 149 |
| Comp. F | Reference TiO$_2$ | 8.7 | 99.25 | 88.27 | 72.9 | 129.2 |

What is claimed is:

1. A cellulose substrate, wherein at least a portion of the cellulose substrate is coated with a layer of a coating composition that comprises a water insoluble α-(1,3→glucan) polymer having 90% or greater α-1,3 glycosidic linkages, wherein the layer of coating composition has an average pore volume in the range of 0.1 to 0.50 milliliters/gram.

2. The cellulose substrate of claim 1, wherein the cellulose substrate is a paper, paperboard, cardboard, or corrugated board.

3. The cellulose substrate of claim 1, wherein the cellulose substrate is a textile.

4. The cellulose substrate of claim 1, wherein said average pore volume is in the range of 0.12 to 0.45 milliliters/gram.

5. The cellulose substrate of claim 1, wherein the water insoluble α-(1,3→glucan) polymer has a number-average degree of polymerization (DPn) of 55 to 10000.

6. The cellulose substrate of claim 5, wherein the DPn is 75 to 1000.

7. The cellulose substrate of claim 1, wherein the water insoluble α-(1,3→glucan) polymer has 95% or greater α-1,3 glycosidic linkages.

8. The cellulose substrate of claim 7, wherein the water insoluble α-(1,3→glucan) polymer has 99% or greater α-1,3 glycosidic linkages.

9. The cellulose substrate of claim 1, wherein the coating composition further comprises at least one pigment.

10. The cellulose substrate of claim 1, wherein the coating composition further comprises at least one binder.

11. The cellulose substrate of claim 10, wherein the binder is polyvinyl alcohol, polyvinyl acetate, partially saponified polyvinyl acetate, silanol-modified polyvinyl alcohol, polyurethane, starch, corn dextrin, carboxy methyl cellulose, cellulose ether, hydroxyethyl cellulose, hydroxypropyl cellulose, ethyl hydroxyethyl cellulose, methyl cellulose, alginate, sodium alginate, xanthan, carrageenan, casein, soy protein, guar gum, synthetic polymer, styrene butadiene latex, or styrene acrylate latex.

12. The cellulose substrate of claim 1, wherein the coating composition comprises 0.1% to 50% by weight of the water insoluble α-(1,3→glucan) polymer, based on the total weight of the coating composition.

13. The cellulose substrate of claim 12, wherein the coating composition comprises 1% to 45% by weight of the water insoluble α-(1,3→glucan) polymer.

14. The cellulose substrate of claim 12, wherein the coating composition comprises 3% to 35% by weight of the water insoluble α-(1,3→glucan) polymer.

15. The cellulose substrate of claim 1, wherein the coating composition is free from starch or hydroxy alkyl starch.

16. An aqueous coating composition comprising an aqueous carrier and a water insoluble α-(1,3→glucan) polymer having 90% or greater α-1,3 glycosidic linkages, wherein the aqueous carrier comprises less than or equal to 60% by weight of the total weight of the aqueous coating composition.

17. A method of forming a layer of a coating composition on a cellulose substrate, said method comprising:
(1) applying an aqueous coating composition to at least a portion of a cellulose substrate, wherein the aqueous coating composition comprises an aqueous carrier and a water insoluble α-(1,3→glucan) polymer having 90% or greater α-1,3-glycosidic linkages, and
(2) removing at least a portion of the aqueous carrier from the applied layer of the aqueous coating composition to form the layer of the coating composition, wherein the layer of the coating composition has an average pore volume in the range of 0.1 to 0.50 milliliters/gram.

18. The method of claim 17, wherein the cellulose substrate is a paper, paperboard, cardboard, or corrugated board.

\* \* \* \* \*